(12) United States Patent
Hemmings et al.

(10) Patent No.: US 6,728,009 B1
(45) Date of Patent: Apr. 27, 2004

(54) CHARGE COUPLED DEVICE SCANNING SYSTEM AND METHOD

(75) Inventors: John Hemmings, Beds (GB); Yasunori Narukawa, London (GB)

(73) Assignee: Fujifilm Electronic Imaging Limited, Herts (GB)

( * ) Notice: Subject to any disclaimer, the term of this patent is extended or adjusted under 35 U.S.C. 154(b) by 0 days.

(21) Appl. No.: 09/502,552

(22) Filed: Feb. 10, 2000

(30) Foreign Application Priority Data

Feb. 11, 1999 (EP) .............................. 99301009

(51) Int. Cl.⁷ .................................. H04M 1/04
(52) U.S. Cl. ................... 358/474; 358/448; 358/497; 358/486
(58) Field of Search ............... 358/474, 283, 358/293, 482, 483, 494, 448, 453, 462, 497, 496, 486

(56) References Cited

U.S. PATENT DOCUMENTS

| | | | | |
|---|---|---|---|---|
| 4,194,221 A | * | 3/1980 | Stoffel | 358/28 |
| 4,288,821 A | * | 9/1981 | Lavallee et al. | 358/293 |
| 5,161,010 A | * | 11/1992 | Birnbaum | 358/79 |
| 6,157,019 A | * | 12/2000 | Hosier | 250/208.1 |

FOREIGN PATENT DOCUMENTS

| | | |
|---|---|---|
| EP | 0 074 795 A1 | 3/1983 |
| EP | 0 605 259 A2 | 7/1994 |
| EP | 0 848 546 A1 | 6/1998 |
| JP | 62-161255 | 7/1987 |
| WO | WO 91/00667 | 1/1991 |

OTHER PUBLICATIONS

Lees, R. et al., "High Performance CCD Telecine for HDTV," *SMPTE Journal*, Oct. 1990, pp. 837–843.

* cited by examiner

*Primary Examiner*—Kimberly Williams
*Assistant Examiner*—Negussie Worku
(74) *Attorney, Agent, or Firm*—Sughrue Mion, PLLC

(57) ABSTRACT

A method of scanning an original image containing image information of different types using a CCD sensor comprising three first linear arrays of photosites sensitive to respective colors. A second linear array of photosites is provided, the pitch between adjacent photosites of the second linear array being different from the pitch between adjacent photosites of the first array. The method comprises causing relative scanning movement between a CCD sensor and the original image while the original image is illuminated, the CCD sensor including at least one first linear array of photosites, and a second linear array of photosites, the pitch between adjacent is photosites of the second linear array being different from the pitch between adjacent photosites of the or each first array monitoring output signals from the at least one first linear array when the at least one first linear array is scanned over a first type of image information: and monitoring output signals from the second linear array when the second linear array is scanned over a second type of image information.

19 Claims, 6 Drawing Sheets

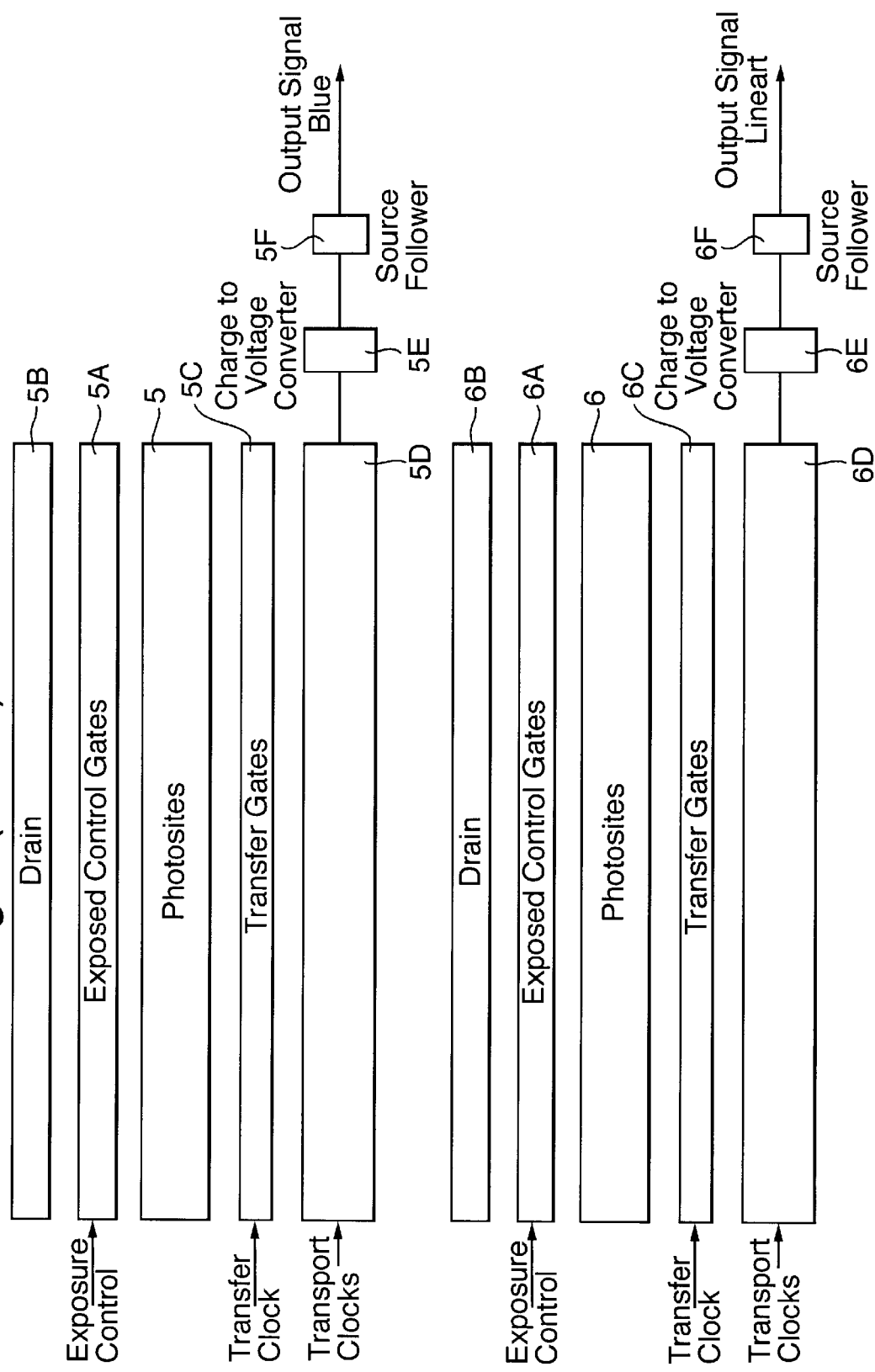

Fig.3.
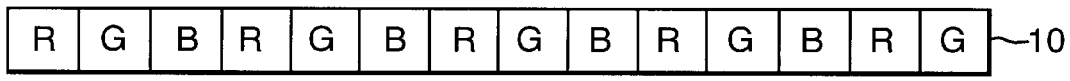
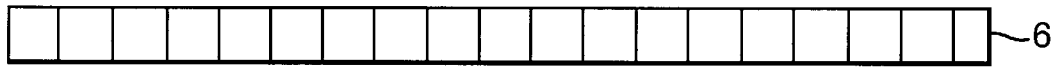
Fig.4.
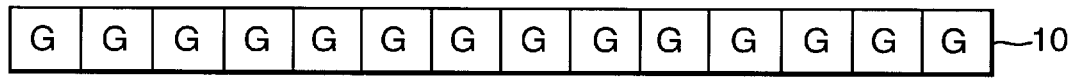
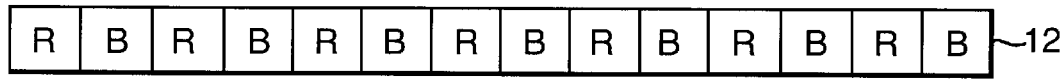
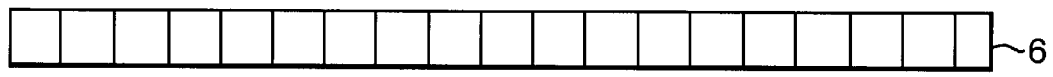
Fig.5.
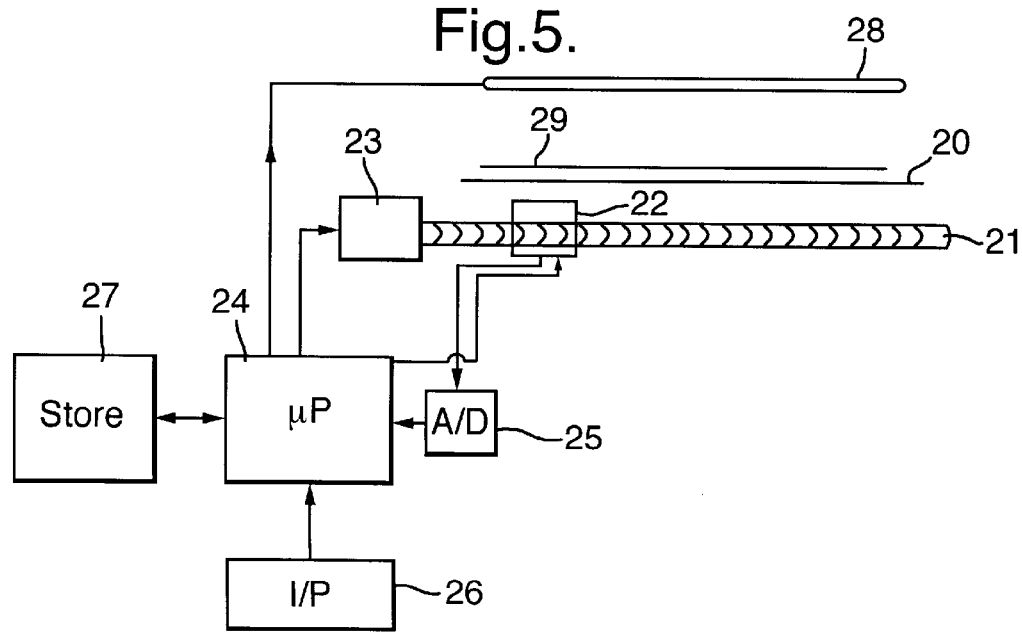

CHARGE COUPLED DEVICE SCANNING SYSTEM AND METHOD

FIELD OF THE INVENTION

The invention relates to a method of scanning original images.

DESCRIPTION OF THE PRIOR ART

Charged coupled device (CCD) sensors are regularly used in image scanning equipment for sensing the colour content of an image. This information is then digitized and can be manipulated and/or stored for subsequent output or transmission. Most colour input scanners presently on the market use a 3-stripe CCD image sensor as a means of sensing the original image. This device has three lines of photosensitive elements (photosites) onto which the original is imaged. Each line has a different colour filter (usually red, green and blue) deposited in front so that the device becomes colour sensitive. The CCD is moved relative to the original during a scan so that a 2-D image of the original, separated into three colours, is built up.

When scanning continuous tone colour graphics such as colour transparencies or colour negatives, the CCD needs certain requirements to achieve the best performance:

1) The size of the photosites determines how many electrons are stored in each site during an exposure period. The larger the photosites, the more electrons can be stored and therefore the dynamic range of the device is increased i.e. the range of light intensity in the original image over which detail can be seen before the device saturates at the high end or detail gets lost in the noise at the low end is increased.

2) Since the output from each photosite represents a discrete sample of the original image light intensity, then Lo achieve the best sharpness in the scanned image, a large number of photosites is required. However, since the original film image is made from colour dye grains, there is no benefit to be gained from resolving detail much smaller than the grain size.

Therefore, a good compromise can be had between maximising dynamic range and achieving the best sharpness before film "Grain noise" is seen. Presently available CCDs typically use 8000 photosites per line with a dynamic range of about 80 dB i.e. a range of about four density in light intensity terms or a greater number of smaller photosites e.g. between 10,000 and 15,000 with less dynamic range.

Many scanners need to be multi-purpose and need to be able to scan other forms of original e.g. lineart (linework) or screened film originals (for the purpose of descreening or copydot). Lineart typically consists of solid black lines on a white background although any colour on any other colour background can be used instead. Typical examples of lineart are line drawings or solid text or a combination of both. The detail present, especially in very fine Kanji text, can be very high. Screened film originals consist of solid black dots of varying sizes on a white background and again there is a high level of detail present in this type of original.

When scanning lineart or screened film originals, the CCD needs a different set of requirements to achieve the best performance.

1) The scanner now has only to be able to set a threshold to differentiate between black and white and therefore the dynamic range of the CCD does not need to be so high and therefore the size of the photosites can be less.

2) Since the CCD needs to be able to resolve finer detail, the more photosites that can be placed across an image of the original the better. To achieve an optical resolution of 1200 photosites per inch (often quoted as 1200 dpi) across the narrow width of an A3 original requires at least 14,000 photosites and allowing for some overscan of the original, at least 16,000 photosites is desirable.

3) Since lineart is not restricted to black on white and can be any colour, it is preferable not to have colour filters on the CCD so that separation of colours can be performed using external filters.

Presently available 3-stripe colour CCDs cannot achieve the best performance when scanning all these types of originals.

WO-A-91/00667 describes the use of a 4-stripe CCD with the $4^{th}$ line (monochrome) having a higher resolution than the other three colour lines. This is used in a motion picture film scanner application for increasing the detail in the picture. The three colour lines provide low definition colour components and the $4^{th}$ high resolution mono line is added in to provide detail enhancement. This is therefore does not address lineart scanning.

JP-A-62161255 also discloses a 4-stripe CCD but used in a photocopying machine. In this patent, a 4-stripe COD is used which consists of a 3-stripe CCD (array 1) and a high resolution stripe (array 2) with no colour filter. Since the application is for a photocopier, there are no prescan or HR scan states. The operator, via the console, stares whether the image is graphics or lineart. If graphics is selected, then the whole image is scanned at graphics resolution using array 1 and output to the print engine. If lineart is selected, then the whole image is scanned at a higher resolution using array 2 and output to the print engine. The system cannot accurately reproduce an original image having both graphics and lineart.

SUMMARY OF THE INVENTION

In accordance with one aspect of the present invention, a method of scanning an original image containing image information of different types comprises causing relative scanning movement between a CCD sensor and the original image while the original image is illuminated, the CCD sensor including on the same substrate at least one first linear array of photosites, and a second linear array of photosites, the pitch between adjacent photosites of the second linear array being different from the pitch between adjacent photosites of the or each first array; monitoring output signals from the at least one first linear array when the at least one first linear array is scanned over a first type of image information; and monitoring output signals from the second linear array when the second linear array is scanned over a second type of image information.

In accordance with a second aspect of the present invention a scanning system comprises a CCD sensor including on the same substrate at least one first linear array of photosites, and a second linear array of photosites, the pitch between adjacent photosites of the second linear array being different from the pitch between adjacent photosites of the or each first array; an image support; means for irradiating an original image on the support; means for causing relative scanning movement between the image support and the CCD sensor whereby radiation from the original image impinges on the CCD sensor; and a processing circuit coupled to the CCD sensor for regularly downloading image information from the CCD sensor and for carrying out a method according to the first aspect of the invention.

With this invention, we use the second linear array of photosites which has a different resolution from the other array(s) of photosites to enable a second type of information to be scanned at the same time as the first type of information. Thus, an original image having more than one type of information can be scanned in a single pass rather than two passes.

In a simple application, the monitored output signals can be displayed but typically they will be stored for further processing.

In one application, output signals from the at least one first linear array will be monitored only when that array is scanned over a first type of image information and output signals from the second linear array will be monitored only when that array is scanned over the second type of image information. Alternatively, output signals from both arrays can be monitored throughout the scanning process and then subsequently processed so that a representation of the original image is generated in which data corresponding to output signals from the at least one first linear array is used to define pixels corresponding to the first type of image information, and data corresponding to output signals from the second linear array is used to define pixels corresponding to the second type of image information.

The location on the original image of different types of information can be defined by the operator manually. In a first alternative, however, the method may further comprise performing a prescan of the original image to define the locations of image information of the different types.

In a second alternative, the type of information being scanned could be determined automatically using, for example, the method described in more detail in EP-A-0881595 incorporated herein by reference.

The "original image" may comprise a single page, for example an A4 sheet, or multiple pages, for example as mounted on the drum of an image scanner or platen of a flat bed scanner.

A variety of different types of information can be scanned. Typically, the first type of information will comprise graphics while the second type of information may comprise lineart or screened images.

Typically, the photosite pitch of the second linear array will be smaller than the pitch of the photosites of the first array so that it can be used for scanning lineart or screened film originals. Thus, the or each first linear array can be fabricated with photosites which are made as large as possible with enough photosites to be able to resolve detail comparable to the film grain size. In this way, the dynamic range is maximised and the sharpness in the scanned image is maximised before film dye grain noise degrades the image. A typical pitch of the photosites of the or each first linear array is in the range 5–12 microns, while the photosite shapes could be rectangular or square. A typical number of photosites is in the range 5000–15000 per line.

In the preferred example, the second linear array has a larger number of smaller photosites so that extra detail can be resolved in the scanned image at the expense of a loss of dynamic range. A typical pitch for the photosites of the second linear array is 2–5 microns and a typical number of photosites for the line is in the range 10000–30000.

In a very simple example, a single first linear array could be provided along with a single second linear array. However, more than one first linear array could be provided and typically there are three, one corresponding to each of the primary colours red, green and blue.

The linear arrays are typically single, linear arrays but in some cases they could each form part of a respective two-dimensional array.

The wavelength sensitivity of each array is typically determined by the use of suitable internal or external filters. Thus, as in conventional CCD arrays, the or each first linear array may have a suitable filter material deposited on it or radiation reaching the first array may have to pass through a suitable external colour filter.

In general, the second linear array will have no colour filter so that lineart of any colour can be scanned. However, a coloured filter could be deposited on the second linear array for the purpose of restricting the range of wavelengths that the lens in a scanner with which the CCD sensor is used sees so that the best sharpness performance of the lens is realised i.e. loss of sharpness due to chromatic abberation is minimized. The second linear array could also have a colour filter deposited for the purpose of restricting the range of wavelengths so that when scanning screened film originals, the visibility of Newton's rings between the original and the platen glass is minimized.

BRIEF DESCRIPTION OF THE DRAWINGS

Some examples of methods and systems according to the invention will now be described with reference to the accompanying drawings, in which:

FIGS. 3 and 4 illustrate alternative constructions of the CCD sensor;

FIG. 5 is a schematic block diagram of a scanning system incorporating the CCD sensor of FIG. 1; and, FIG. 6 is a block diagram illustrating how an example of the method is implemented.

DESCRIPTION OF THE EMBODIMENTS

Figure 1:
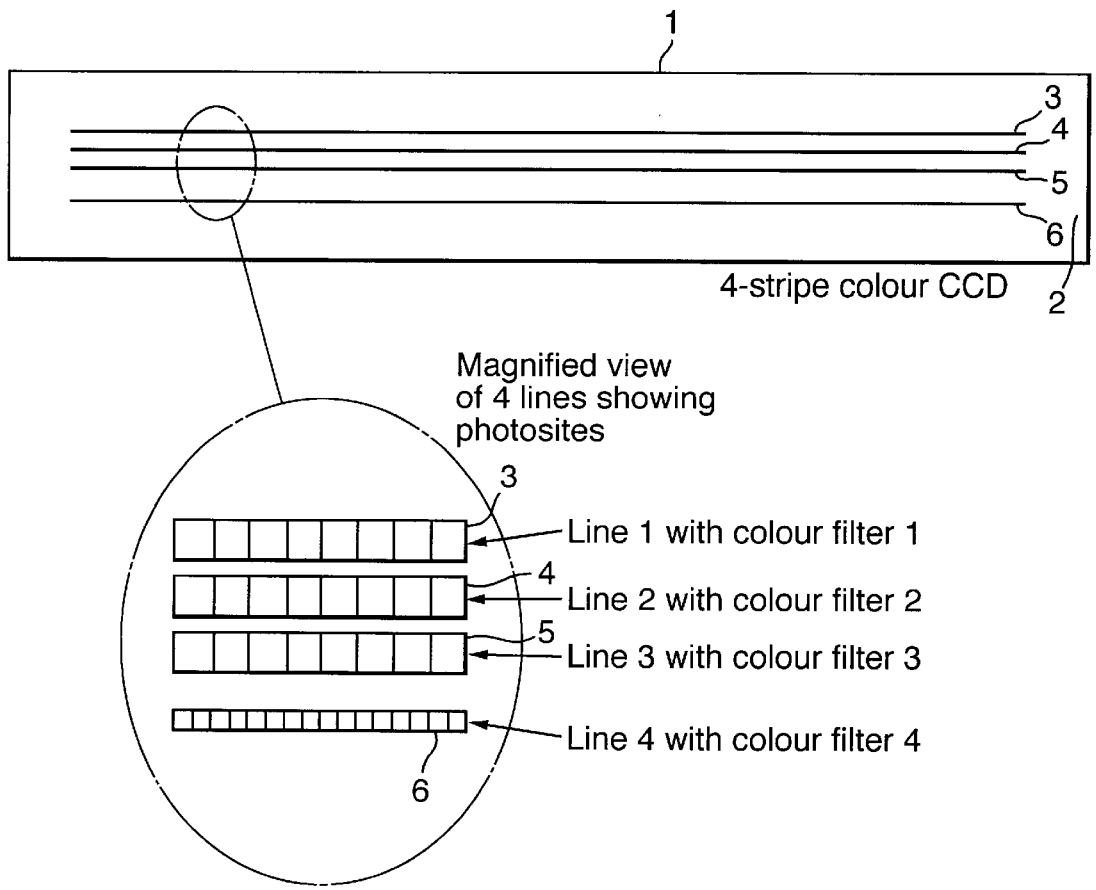
FIG. 1 is a schematic plan view with a partly enlarged section of a CCD sensor.

The CCD sensor 1 shown in FIG. 1 is fabricated on a single substrate 2 and comprises four linear arrays of photosites 3–6. The arrays of photosites 3–5 are substantially identical in chat each photosite has the same pitch relative to adjacent photosites. The arrays 3–5 differ in that each has deposited on it a respective colour filter so as to make the photosites sensitive to photons corresponding to different colours. Thus, the linear array 3 is sensitive to red light, the linear array 4 is sensitive to green light, and the linear array 5 is sensitive to blue light.

The linear array 6 is arranged parallel co the arrays 3–5 and as can be seen in the enlarged portion of FIG. 1, has photosites with a different pitch to the arrays 3–5. There need be no relationship between the respective pitches of phorosites 3–5 and phocosices 6.

The linear array 6 may be made with or without a deposited colour filter as follows:

1) The linear array 6 may have no colour filter. Therefore, lineart of any colour can be scanned and external filters can be used to separate one colour from another in the original.

2) The linear array 6 can have a colour filter deposited on it for the purpose of restricting the range of wavelengths that the lens in the scanner sees so that the best sharpness performance of the lens is realised, e.g. loss of sharpness due to chromatic abberation is minimized.

3) The linear array 6 can have a colour filter deposited on it for the purpose of restricting the range of wavelengths so that when scanning screened film originals, the visibility of Newton's rings between the original and the platen glass is minimized.

The size and pitch of the arrays 3–6 is preferably as defined earlier.

Figure 2:
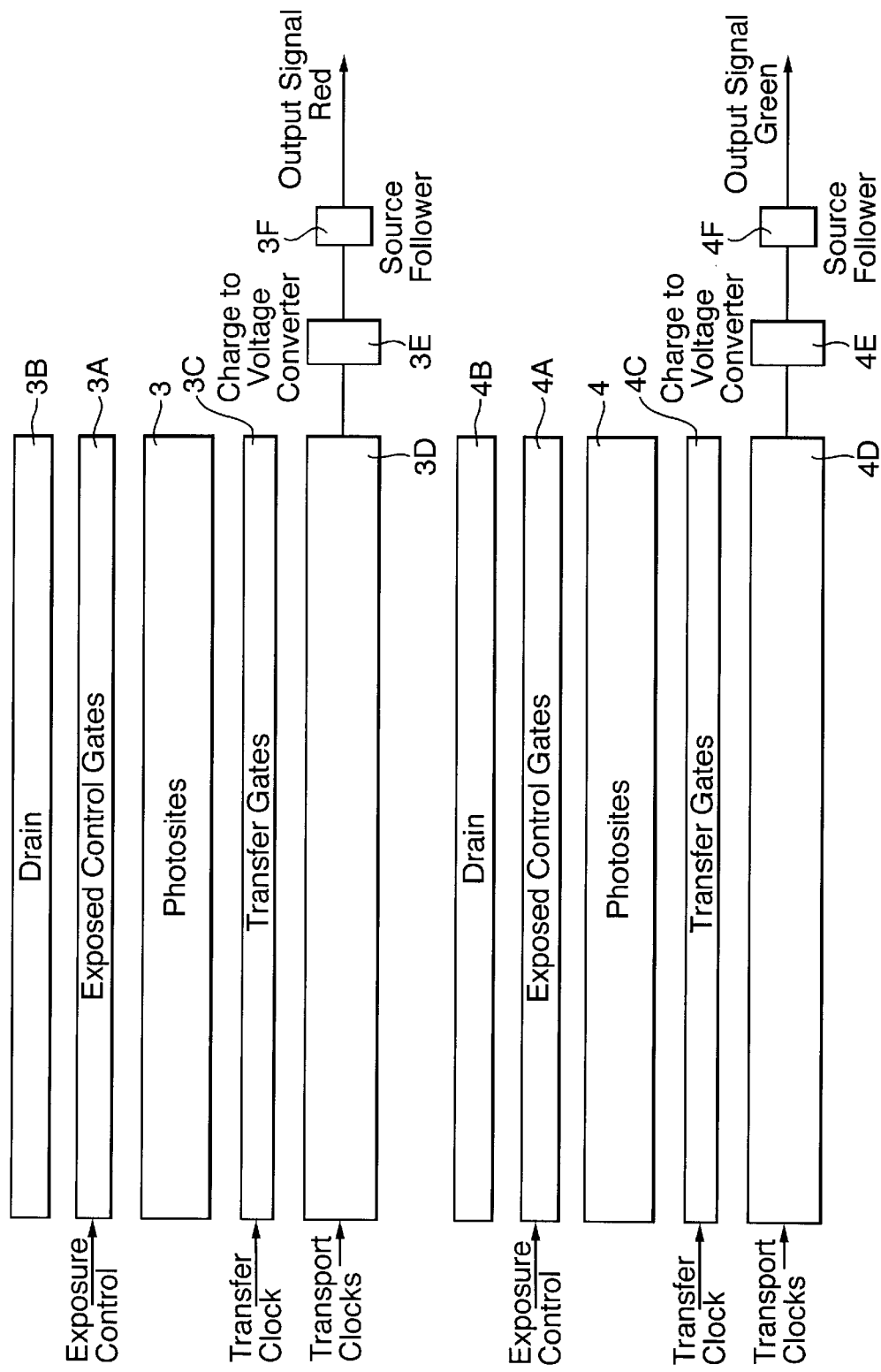
FIG. 2 is a schematic block diagram of the construction of the CCD sensor shown in FIG. 1.

The internal construction of the CCD sensor is shown in more detail in FIG. 2. Each array of photosites 3–6 is coupled on one side to a set of exposure control gates 3A–6A which are in turn coupled to respective drains 3B–6B. Each array of photosites 3–6 is also coupled via respective sets of transfer gates 3C–6C to respective shift registers 3D–6D.

Each shift register is connected to a respective charge to voltage converter 3E–6F which in turn is connected co a respective source follower 3F–6F from which respective output signals are provided.

Each set of components within the CCD sensor operates in a similar manner and the operation of one set 3–3F will be described.

Prior to an integration period, excess charge is sunk to the drain 3B by operating the exposure control gates 3A. This avoids saturation of the wells during subsequent integration and consequent overflow from one well into adjacent ones (blooming).

During the integration period, photons fall onto the photosites 3, the number on each photosite depending on the original image being scanned. A proportion of these (depending on the quantum efficiency) generate electrons which are stored in each photosite well. During integration, the transfer gates 3C and the exposure control gates 3A are held off to avoid charge leakage.

At the end of the exposure period (the sum of the sink time and the integration time), the transfer gates 3C are opened and the charge in each photosite is transferred to a corresponding location in the analogue shift register 3D. During this time, the CCD clocks which transport the charge along the shift register are held off.

At the end of the transfer period, the transport clocks are clocked to transfer the charge packets along the shift register 3D. At the end of the shift register 3D, each charge packet is converted into a voltage by a charge to voltage converter 3E. The signal is buffered by a source follower 3F and passed out of the CCD sensor.

The clock frequencies used with the shift register 6D could be the same or different from that used with the shift registers 3D–5D.

Operation of the exposure control gates, transfer gates and shift register is controlled via respective input control lines, as shown, which receive signals from a controlling microprocessor (FIG. 5).

In the example described above, three linear arrays 3–5 of photosites are shown, one for each colour. However, three colour scanning could also be achieved using a single linear array as shown at 10 in FIG. 3, successive photosites within the array 10 being arranged to be sensitive to red, green and blue light respectively. The array 6 remains as before.

FIG. 4 illustrates a further alternative in which the linear arrays 3–5 of FIG. 1 are replaced by two linear arrays 11, 12, all the photosites of the array 11 being sensitive to green light and alternate photosites in the array 12 being sensitive to red and blue light respectively. Again, the array 6 is constructed as before.

FIG. 5 illustrates schematically a flat bed scanner with which any of the CCD arrays described above could be used. The scanner comprises a glass platen 20 on which an image to be scanned is placed. Beneath the platen 20 is mounted a lead screw 21 on which is mounted a CCD housing 22 containing a CCD array of the type described above. The lead screw 21 is rotated by a motor 23 controlled from a microprocessor 24. The microprocessor is connected to the shift registers of the CCD via an A/D converter 25. The microprocessor 24 is also connected to the control lines coupled with the exposure control gates, transfer gates and transport clocks to the shift registers.

The microprocessor 24 is controlled via an input device 26 such as a keyboard and/or mouse and is also connected to a store 27 such as a hard disk.

In operation, an image 29 is laid on the platen 20, a light source 28 is activated by the microprocessor 24 and the motor 23 is activated to cause the CCD array housing 22 to scan along the image. Each linear array 3–6 of the CCD within the housing 22 extends in a direction perpendicular to the scanning direction (i.e. into the paper as shown in FIG. 5). At frequent intervals, the microprocessor 24 controls the CCD array to transfer image information to the respective shift registers which are then controlled to shift the information out to the A/D converters 25 from where it is processed and then passed to the store 27.

Initially, the image 50 is prescanned (step 40, FIG. 6) and the location of graphics regions 41 and lineart regions 42 is determined. This can be done manually by the user observing the result of the prescan or automatically as mentioned above (step 43). As a result, a graphics mask 44 and a lineart mask 45 are generated. The prescan will typically be carried out using the arrays 3–5.

It should be noted that the masks need not be rectangular and, for example, could separate lineart wrapped around a graphics image.

Figure 6:
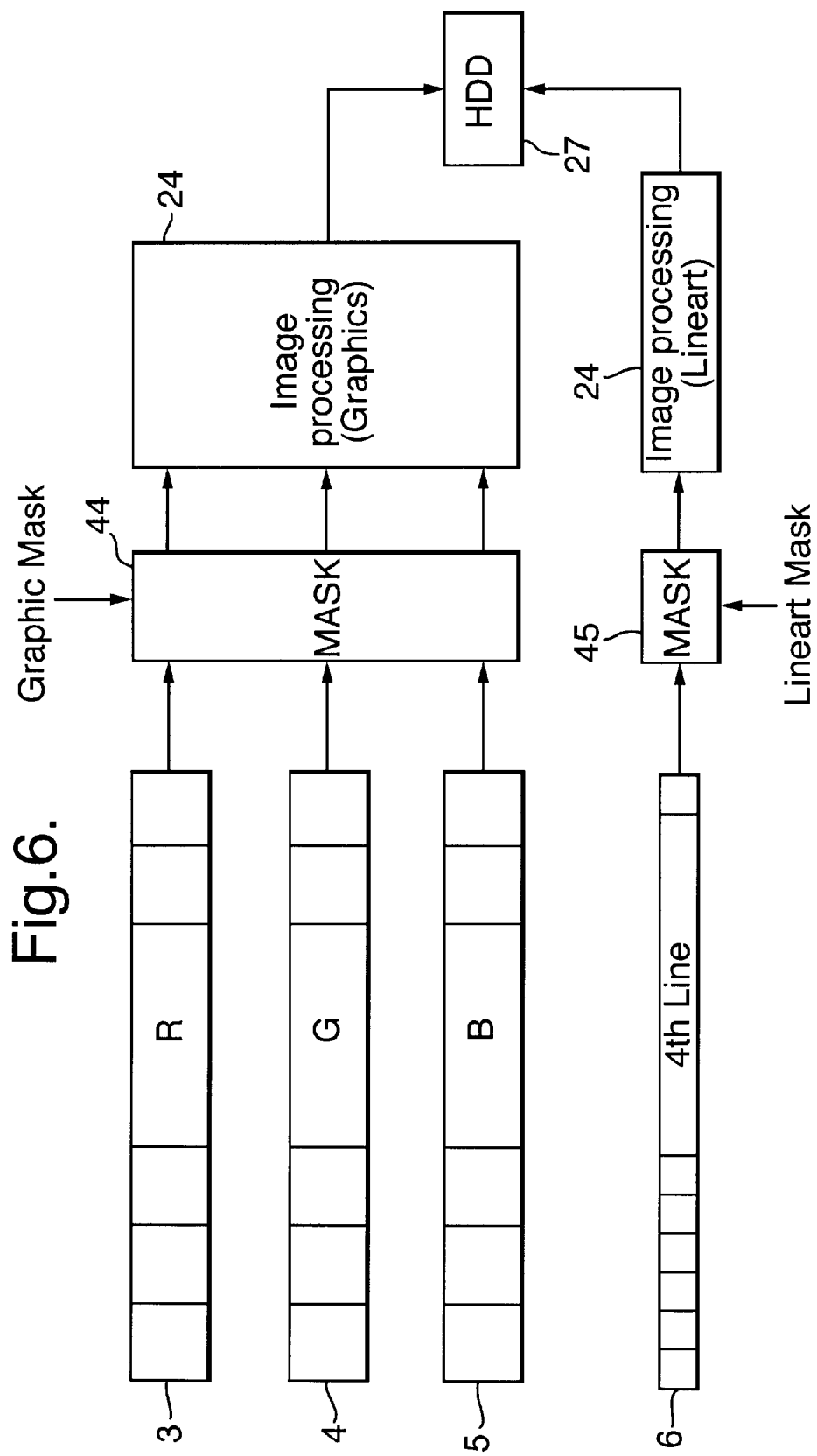
Figure 6:
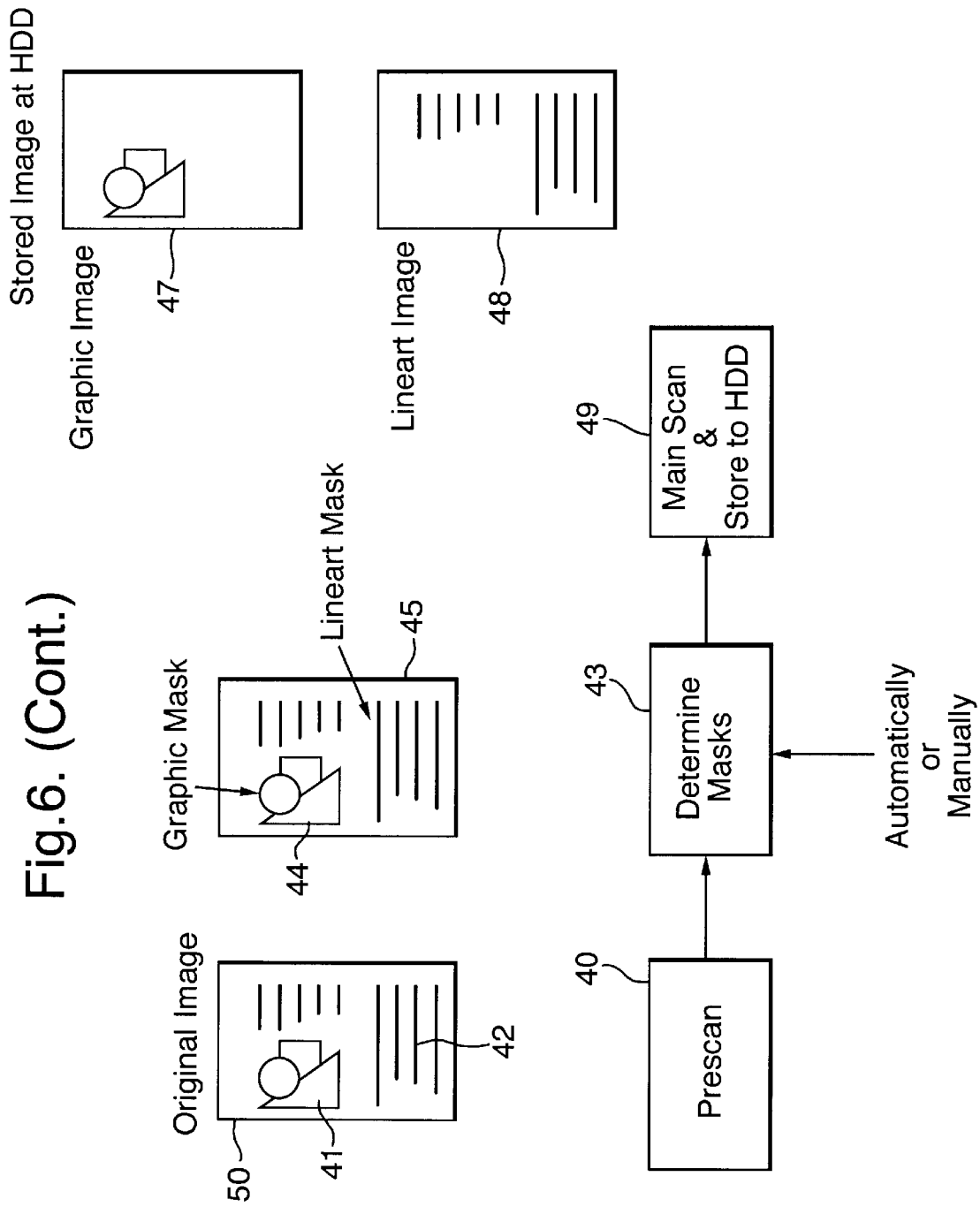

The original image 50 is then scanned 49 at high resolution in a single pass, the output signals from the graphics arrays 3–5 being passed via the graphics mask 44 co the microprocessor 24 which causes the graphics pixel data to be stored in corresponding locations in the store 27. Output signals from the array 6 are passed via the lineart mask 45 to the microprocessor 24 which causes the lineart data to be stored in corresponding locations in the store 27. As indicated in FIG. 6, the graphics image stored in the store 27 has data located in pixels corresponding to the graphics 41 in the original image while the rest of the stored graphics image 47 is blank. The lineart image 48 contains lineart data in pixels corresponding to the lineart 42 in the original image while the remaining pixels are blank.

The stored images 47, 48 can then be processed in any conventional manner, for example to provide a display on a monitor of the two images either separately or after combining together co reproduce the original image.

If the array 6 is used without a filter real time scratch detection and the like can be carried out by utilizing infrared light. A technique for dealing with scratch detection and rejection is described in more detail in EP-A-0816833.

We claim:

1. A method of scanning an original image containing image information of different types, the method comprising scanning the original image by causing relative scanning movement between a CCD sensor and the original image while the original image is illuminated, the CCD sensor including on the same substrate at least one first linear array of photosites, and a second linear array of photosites, the pitch between adjacent photosites of the second linear array being different from the pitch between adjacent photosites of the or each first array; and monitoring output signals from the at least one first linear array when the at least one first linear array is scanned over a first type of image information and monitoring output signals from the second linear array when the second linear array is scanned over a second type of image information; the method further comprising, prior to said scanning, performing a prescan of the original image to define the locations of the different types of image information.

2. A method according to claim 1, further comprising storing said output signals.

3. A method according to claim 1, further comprising generating a representation of the original image in which data corresponding to output signals from the at least one first linear array is used to define pixels corresponding to the first type of image information and data corresponding to output signals form the second linear array is used to define pixels corresponding to the second type of image information.

4. A method according to claim 1, wherein the first type of image information comprises graphics.

5. A method according to claim 1, wherein the second type of information comprises lineart or screened images.

6. A method according to claim 5, wherein each first linear array is sensitive to photons corresponding to respective different colours.

7. A method according to claim 1, wherein the pitch between photosites of the second linear array is smaller than the pitch between photosites of the or each first linear array.

8. A method according to claim 1, wherein more than one first linear array is provided.

9. A method according to claim 1, wherein adjacent photosites of the first linear array are sensitive to photons corresponding to respective different colours.

10. A method according to claim 1, wherein the second linear array is sensitive to photons corresponding to any visible colour.

11. A method according to claim 1, wherein the second linear array is sensitive to photons corresponding to colours in the non-visible range, for example infrared.

12. A method according to claim 1, wherein each photosite of the first linear array has a pitch between adjacent photosites in the range 5–12 microns.

13. A method according to claim 1, wherein the pitch between adjacent photosites of the second linear array is less than 5 microns.

14. A method according to claim 13, wherein the pitch between adjacent photosites of the second linear array is in the range of 2–5 microns.

15. A method according to claim 1, wherein each first linear array comprises 5000–15000 photosites.

16. A method according to claim 1, wherein each second linear array comprises 10000 to 30000 photosites.

17. A method according to claim 1, wherein each linear array is coupled via transfer gates to a shift register.

18. A method according to claim 17, wherein a set of transfer gates and a shift register are provided for each array.

19. A scanning system comprising a CCD sensor including on the same substrate at least one first linear array of photosites, and a second linear array of photosites, the pitch between adjacent photosites of the second linear array being different from the pitch between adjacent photosites of the or each first array; an image support; means for irradiating an original image on the support; means for causing relative scanning movement between the image support and CCD sensor whereby radiation from the original image impinges on the CCD sensor; and a processing circuit coupled to the CCD sensor for regularly downloading image information from the CCD sensor and for carrying out a method according to claim 1, wherein the method includes performing a prescan of the original image before scanning the original image.

* * * * *